US010196557B2

(12) United States Patent
Hill et al.

(10) Patent No.: US 10,196,557 B2
(45) Date of Patent: *Feb. 5, 2019

(54) METHODS AND COMPOSITIONS FOR STIMULATING THE PRODUCTION OF HYDROCARBONS FROM SUBTERRANEAN FORMATIONS

(71) Applicant: Flotek Chemistry, LLC, Houston, TX (US)

(72) Inventors: Randal M. Hill, The Woodlands, TX (US); Lakia M. Champagne, The Woodlands, TX (US); Nathan L. Lett, Cypress, TX (US); Keith Ingram Dismuke, Katy, TX (US); David Germack, The Woodlands, TX (US); Nicole Mast, Spring, TX (US); Melinda Soeung, Houston, TX (US)

(73) Assignee: Flotek Chemistry, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/071,332

(22) Filed: Mar. 16, 2016

(65) Prior Publication Data

US 2016/0194550 A1 Jul. 7, 2016

Related U.S. Application Data

(63) Continuation of application No. 13/918,155, filed on Jun. 14, 2013, now Pat. No. 9,321,955.

(51) Int. Cl.
*E21B 43/22* (2006.01)
*E21B 43/26* (2006.01)
(Continued)

(52) U.S. Cl.
CPC .............. *C09K 8/602* (2013.01); *C09K 8/26* (2013.01); *C09K 8/40* (2013.01); *C09K 8/68* (2013.01);
(Continued)

(58) Field of Classification Search
CPC . C09K 8/524; C09K 8/80; C09K 8/68; C09K 8/52; C09K 8/584; C09K 8/602;
(Continued)

(56) References Cited

U.S. PATENT DOCUMENTS 3,060,210 A 4/1961 De Groote
3,047,062 A 7/1962 Meadors
(Continued)

FOREIGN PATENT DOCUMENTS

CN 102127414 A 7/2011
CN 102277143 B 12/2011
(Continued)

OTHER PUBLICATIONS

International Search Report and Written Opinion for Application No. PCT/US2014/042326 dated Oct. 17, 2014.
(Continued)

*Primary Examiner* — Zakiya W Bates
(74) *Attorney, Agent, or Firm* — Wolf, Greenfield & Sacks, P.C.

(57) ABSTRACT

Methods for treating an oil well having a wellbore. The methods involve injecting a microemulsion into the wellbore to increase formation crude oil production by the well. The microemulsion comprises water, a first type of solvent and a first type of surfactant. The microemulsion includes a continuous water phase.

15 Claims, 1 Drawing Sheet

(51) Int. Cl.
*C09K 8/60* (2006.01)
*C09K 8/26* (2006.01)
*C09K 8/40* (2006.01)
*C09K 8/70* (2006.01)
*C09K 8/72* (2006.01)
*C09K 8/90* (2006.01)
*C09K 8/68* (2006.01)
*C09K 8/86* (2006.01)

(52) U.S. Cl.
CPC .............. *C09K 8/70* (2013.01); *C09K 8/72* (2013.01); *C09K 8/86* (2013.01); *C09K 8/90* (2013.01); *E21B 43/26* (2013.01)

(58) Field of Classification Search
CPC .. C09K 8/36; C09K 8/035; C09K 8/26; E21B 43/04; E21B 43/16; E21B 43/267; E21B 43/26; E21B 21/062
See application file for complete search history.

(56) References Cited

U.S. PATENT DOCUMENTS

| | | |
|---|---|---|
| 3,347,789 A | 10/1967 | Dickson et al. |
| 3,368,624 A | 2/1968 | Heuer et al. |
| 3,483,923 A | 12/1969 | Darley |
| 3,710,865 A | 1/1973 | Kiel |
| 3,756,319 A | 9/1973 | Holm et al. |
| 3,760,881 A | 9/1973 | Kiel |
| 3,850,248 A | 11/1974 | Carney |
| 3,919,411 A | 11/1975 | Glass et al. |
| 4,005,020 A | 1/1977 | McCormick |
| 4,206,809 A | 6/1980 | Jones |
| 4,233,165 A | 11/1980 | Salathiel et al. |
| 4,276,935 A | 7/1981 | Hessert et al. |
| 4,360,061 A | 11/1982 | Canter et al. |
| 4,414,128 A | 11/1983 | Goffinet |
| 4,472,291 A | 9/1984 | Rosano |
| 4,511,488 A | 4/1985 | Matta |
| 4,650,000 A | 3/1987 | Andreasson et al. |
| 4,844,756 A | 7/1989 | Forsberg |
| 5,008,026 A | 4/1991 | Gardner et al. |
| 5,034,140 A | 7/1991 | Gardner et al. |
| 5,076,954 A | 12/1991 | Loth et al. |
| 5,083,613 A | 1/1992 | Gregoli et al. |
| 5,095,989 A | 3/1992 | Prukop |
| 5,217,531 A | 6/1993 | Cheung |
| 5,247,995 A | 9/1993 | Tjon-Joe-Pin et al. |
| 5,310,002 A | 5/1994 | Blauch et al. |
| 5,356,482 A | 10/1994 | Mehta et al. |
| 5,567,675 A | 10/1996 | Romocki |
| 5,587,354 A | 12/1996 | Duncan, Jr. |
| 5,587,357 A | 12/1996 | Rhinesmith |
| 5,604,195 A | 2/1997 | Misselyn et al. |
| 5,652,200 A | 7/1997 | Davies et al. |
| 5,665,689 A | 9/1997 | Durbut |
| 5,676,763 A | 10/1997 | Salisbury et al. |
| 5,697,458 A | 12/1997 | Carney |
| 5,707,940 A | 1/1998 | Bush et al. |
| 5,762,138 A | 6/1998 | Ford et al. |
| 5,784,386 A | 7/1998 | Norris |
| 5,811,383 A | 9/1998 | Klier et al. |
| 5,830,831 A | 11/1998 | Chan et al. |
| 5,874,386 A | 2/1999 | Chan et al. |
| 5,925,233 A | 7/1999 | Miller et al. |
| 5,975,206 A | 11/1999 | Woo et al. |
| 5,977,032 A | 11/1999 | Chan |
| 5,990,072 A | 11/1999 | Gross et al. |
| 5,996,692 A | 12/1999 | Chan et al. |
| 6,046,140 A | 4/2000 | Woo et al. |
| 6,090,754 A | 7/2000 | Chan et al. |
| 6,110,885 A | 8/2000 | Chan |
| 6,112,814 A | 9/2000 | Chan et al. |
| 6,165,946 A | 12/2000 | Mueller et al. |
| 6,173,776 B1 | 1/2001 | Furman et al. |
| 6,191,090 B1 | 2/2001 | Mondin et al. |
| 6,228,830 B1 | 5/2001 | Vlasblom |
| 6,260,621 B1 | 7/2001 | Furman et al. |
| 6,302,209 B1 | 10/2001 | Thompson, Sr. et al. |
| 6,364,020 B1 | 4/2002 | Crawshaw et al. |
| 6,486,115 B1 | 11/2002 | Weaver et al. |
| 6,581,687 B2 | 6/2003 | Collins et al. |
| 6,593,279 B2 | 7/2003 | Von Krosigk et al. |
| 6,613,720 B1 | 9/2003 | Feraud et al. |
| 6,729,402 B2 | 5/2004 | Chang et al. |
| 6,770,603 B1 | 8/2004 | Sawdon et al. |
| 6,793,025 B2 | 9/2004 | Patel et al. |
| 6,800,593 B2 | 10/2004 | Dobson, Jr. et al. |
| 6,818,595 B2 | 11/2004 | Benton et al. |
| 6,911,417 B2 | 6/2005 | Chan et al. |
| 6,914,040 B2 | 7/2005 | Deak et al. |
| 6,939,832 B2 | 9/2005 | Collins |
| 6,984,610 B2 | 1/2006 | VonKrosigk et al. |
| 7,021,378 B2 | 4/2006 | Prukop |
| 7,134,496 B2 | 11/2006 | Jones et al. |
| 7,205,262 B2 | 4/2007 | Schwartz et al. |
| 7,205,264 B2 | 4/2007 | Boles |
| 7,231,976 B2 | 6/2007 | Berry et al. |
| 7,392,844 B2 | 7/2008 | Berry et al. |
| 7,407,915 B2 | 8/2008 | Jones et al. |
| 7,468,402 B2 | 12/2008 | Yang et al. |
| 7,481,273 B2 | 1/2009 | Javora et al. |
| 7,514,390 B2 | 4/2009 | Chan |
| 7,514,391 B2 | 4/2009 | Chan |
| 7,533,723 B2 | 5/2009 | Hughes et al. |
| 7,543,644 B2 | 6/2009 | Huang et al. |
| 7,543,646 B2 | 6/2009 | Huang et al. |
| 7,547,665 B2 | 6/2009 | Welton et al. |
| 7,552,771 B2 | 6/2009 | Eoff et al. |
| 7,559,369 B2 | 7/2009 | Roddy et al. |
| 7,581,594 B2 | 9/2009 | Tang |
| 7,615,516 B2 | 11/2009 | Yang et al. |
| 7,621,334 B2 | 11/2009 | Welton et al. |
| 7,622,436 B2 | 11/2009 | Tuzi et al. |
| 7,655,603 B2 | 2/2010 | Crews |
| 7,677,311 B2 | 3/2010 | Abad et al. |
| 7,687,439 B2 | 3/2010 | Jones et al. |
| 7,709,421 B2 | 5/2010 | Jones et al. |
| 7,712,534 B2 | 5/2010 | Bryant et al. |
| 7,727,936 B2 | 6/2010 | Pauls et al. |
| 7,727,937 B2 | 6/2010 | Pauls et al. |
| 7,730,958 B2 | 6/2010 | Smith |
| 7,825,073 B2 | 11/2010 | Welton et al. |
| 7,833,943 B2 | 11/2010 | Van Zanten et al. |
| 7,838,467 B2 | 11/2010 | Jones et al. |
| 7,846,877 B1 | 12/2010 | Robb |
| 7,851,414 B2 | 12/2010 | Yang et al. |
| 7,855,168 B2 | 12/2010 | Fuller et al. |
| 7,857,051 B2 | 12/2010 | Abad et al. |
| 7,886,824 B2 | 2/2011 | Kakadjian et al. |
| 7,893,010 B2 | 2/2011 | Ali et al. |
| 7,902,123 B2 | 3/2011 | Harrison et al. |
| 7,906,464 B2 | 3/2011 | Davidson |
| 7,910,524 B2 | 3/2011 | Welton et al. |
| 7,931,088 B2 | 4/2011 | Stegemoeller et al. |
| 7,960,314 B2 | 6/2011 | Van Zanten et al. |
| 7,960,315 B2 | 6/2011 | Welton et al. |
| 7,963,720 B2 | 6/2011 | Hoag et al. |
| 7,971,659 B2 | 7/2011 | Gatlin et al. |
| 7,976,241 B2 | 7/2011 | Hoag et al. |
| 7,989,404 B2 | 8/2011 | Kakadjian et al. |
| 7,992,656 B2 | 8/2011 | Dusterhoft et al. |
| 7,998,911 B1 | 8/2011 | Berger et al. |
| 8,043,996 B2 | 10/2011 | Harris |
| 8,053,396 B2 | 11/2011 | Huff et al. |
| 8,053,397 B2 | 11/2011 | Huang et al. |
| 8,057,682 B2 | 11/2011 | Hoag et al. |
| 8,091,644 B2 * | 1/2012 | Clark ................. C09K 8/52 166/305.1 |
| 8,091,645 B2 | 1/2012 | Quintero et al. |
| 8,091,646 B2 | 1/2012 | Quintero et al. |
| 8,100,190 B2 | 1/2012 | Weaver et al. |
| 8,148,303 B2 | 4/2012 | Van Zanten et al. |
| 8,183,182 B2 | 5/2012 | Oliveira et al. |

(56) References Cited

U.S. PATENT DOCUMENTS

| | | |
|---|---|---|
| 8,206,062 B2 | 6/2012 | Hoag et al. |
| 8,207,096 B2 | 6/2012 | van Zanten et al. |
| 8,210,263 B2 | 7/2012 | Quintero et al. |
| 8,220,546 B2 | 7/2012 | Kakadjian et al. |
| 8,227,382 B2 | 7/2012 | Dakin et al. |
| 8,231,947 B2 | 7/2012 | Vaidya et al. |
| 8,235,120 B2 | 8/2012 | Quintero et al. |
| 8,242,059 B2 | 8/2012 | Sawdon |
| 8,293,687 B2 | 10/2012 | Giffin |
| 8,342,241 B2 | 1/2013 | Hartshorne et al. |
| 8,349,771 B2 | 1/2013 | Seth et al. |
| 8,356,667 B2 | 1/2013 | Quintero et al. |
| 8,357,639 B2 | 1/2013 | Quintero et al. |
| 8,372,789 B2 | 2/2013 | Harris et al. |
| 8,383,560 B2 | 2/2013 | Pich et al. |
| 8,403,051 B2 | 3/2013 | Huang et al. |
| 8,404,623 B2 | 3/2013 | Robb et al. |
| 8,413,721 B2 | 4/2013 | Welton et al. |
| 8,415,279 B2 | 4/2013 | Quintero et al. |
| 8,431,620 B2 | 4/2013 | Del Gaudio et al. |
| 8,453,741 B2 | 6/2013 | van Zanten |
| 8,499,832 B2 | 8/2013 | Crews et al. |
| 8,517,100 B2 | 8/2013 | Ali et al. |
| 8,517,104 B2 | 8/2013 | Kieffer |
| 8,524,643 B2 | 9/2013 | Huff et al. |
| 8,551,926 B2 | 10/2013 | Huang et al. |
| 8,592,350 B2 | 11/2013 | van Zanten et al. |
| 8,684,079 B2 | 4/2014 | Wattenbarger et al. |
| 8,778,850 B2 | 7/2014 | Andrecola |
| 9,102,860 B2 * | 8/2015 | Cawiezel ............... C09K 8/035 |
| 9,321,955 B2 | 4/2016 | Penny et al. |
| 2001/0007663 A1 | 7/2001 | Von Corswant |
| 2003/0022944 A1 | 1/2003 | Gumkowski et al. |
| 2003/0069143 A1 | 4/2003 | Collins |
| 2003/0166472 A1 | 9/2003 | Pursley et al. |
| 2003/0232095 A1 | 12/2003 | Garti et al. |
| 2006/0014648 A1 | 1/2006 | Milson et al. |
| 2006/0211593 A1 | 9/2006 | Smith et al. |
| 2006/0258541 A1 | 11/2006 | Crews |
| 2007/0123445 A1 | 5/2007 | Tuzi et al. |
| 2007/0293404 A1 | 12/2007 | Hutchins et al. |
| 2007/0295368 A1 | 12/2007 | Harrison et al. |
| 2008/0020949 A1 | 1/2008 | Trimble |
| 2008/0274918 A1 | 11/2008 | Quintero et al. |
| 2008/0287324 A1 | 11/2008 | Pursley et al. |
| 2009/0078415 A1 | 3/2009 | Fan et al. |
| 2009/0137432 A1 | 5/2009 | Sullivan et al. |
| 2009/0159288 A1 | 6/2009 | Horvath Szabo et al. |
| 2009/0221456 A1 | 9/2009 | Harrison et al. |
| 2009/0260819 A1 | 10/2009 | Kurian et al. |
| 2009/0275488 A1 | 11/2009 | Zamora et al. |
| 2009/0281004 A1 | 11/2009 | Ali et al. |
| 2010/0022421 A1 | 1/2010 | Gutierrez et al. |
| 2010/0173805 A1 | 7/2010 | Pomerleau |
| 2010/0216670 A1 | 8/2010 | Del Gaudio et al. |
| 2010/0243248 A1 | 9/2010 | Golomb et al. |
| 2010/0252267 A1 | 10/2010 | Harris et al. |
| 2010/0263863 A1 | 10/2010 | Quintero et al. |
| 2010/0272765 A1 | 10/2010 | Ho O et al. |
| 2010/0307757 A1 | 12/2010 | Blow et al. |
| 2011/0021386 A1 | 1/2011 | Ali et al. |
| 2011/0136706 A1 | 6/2011 | Carroll et al. |
| 2011/0146983 A1 | 6/2011 | Sawdon |
| 2011/0190174 A1 | 8/2011 | Weerasooriya et al. |
| 2011/0220353 A1 | 9/2011 | Bittner et al. |
| 2011/0237467 A1 | 9/2011 | Cornette et al. |
| 2011/0253365 A1 | 10/2011 | Crews et al. |
| 2011/0290491 A1 | 12/2011 | Gupta et al. |
| 2012/0004146 A1 | 1/2012 | Van Zanten et al. |
| 2012/0015852 A1 | 1/2012 | Quintero et al. |
| 2012/0071366 A1 | 3/2012 | Falana et al. |
| 2012/0080232 A1 | 4/2012 | Muller et al. |
| 2012/0129738 A1 | 5/2012 | Gupta et al. |
| 2012/0149626 A1 | 6/2012 | Fluck et al. |
| 2012/0168165 A1 | 7/2012 | Holcomb et al. |
| 2012/0181019 A1 | 7/2012 | Saini et al. |
| 2012/0193095 A1 | 8/2012 | Varadaraj et al. |
| 2012/0208726 A1 | 8/2012 | Smith et al. |
| 2012/0234548 A1 | 9/2012 | Dyer |
| 2012/0241155 A1 | 9/2012 | Ali et al. |
| 2012/0241220 A1 | 9/2012 | Quintero et al. |
| 2012/0255887 A1 | 10/2012 | Holms et al. |
| 2012/0261120 A1 | 10/2012 | Del Gaudio et al. |
| 2012/0285690 A1 | 11/2012 | Weaver et al. |
| 2012/0285694 A1 | 11/2012 | Morvan et al. |
| 2012/0318504 A1 | 12/2012 | Fan et al. |
| 2012/0318515 A1 | 12/2012 | Cawiezel et al. |
| 2012/0322697 A1 | 12/2012 | Zhang |
| 2012/0325492 A1 | 12/2012 | Fefer et al. |
| 2013/0048281 A1 | 2/2013 | Van Zanten et al. |
| 2013/0079255 A1 | 3/2013 | Del Gaudio et al. |
| 2013/0109597 A1 | 5/2013 | Sarkar et al. |
| 2013/0133886 A1 | 5/2013 | Quintero |
| 2013/0137611 A1 | 5/2013 | Pierce et al. |
| 2013/0146288 A1 | 6/2013 | Smith et al. |
| 2013/0146545 A1 | 6/2013 | Pabalan et al. |
| 2013/0153232 A1 | 6/2013 | Bobier et al. |
| 2013/0153234 A1 | 6/2013 | Bobier et al. |
| 2013/0192826 A1 | 8/2013 | Kurian et al. |
| 2013/0233559 A1 | 9/2013 | van Zanten et al. |
| 2013/0244913 A1 | 9/2013 | Maberry et al. |
| 2013/0261033 A1 | 10/2013 | Nguyen |
| 2014/0005079 A1 | 1/2014 | Dahanayake et al. |
| 2014/0110344 A1 | 4/2014 | Hoag et al. |
| 2014/0202700 A1 | 7/2014 | Blair |
| 2014/0332212 A1 | 11/2014 | Ayers et al. |
| 2014/0371115 A1 | 12/2014 | Hill et al. |

FOREIGN PATENT DOCUMENTS

| | | |
|---|---|---|
| CN | 103614128 A | 3/2014 |
| CN | 103642477 A | 3/2014 |
| EP | 1 051 237 B1 | 11/2003 |
| EP | 1 378 554 A1 | 1/2004 |
| EP | 1 786 879 B1 | 2/2012 |
| EP | 2 195 400 B1 | 8/2012 |
| EP | 1 880 081 B1 | 3/2013 |
| WO | WO 1999/049182 A1 | 9/1999 |
| WO | WO 2005/048706 A2 | 6/2005 |
| WO | WO 2007/011475 A1 | 1/2007 |
| WO | WO 2012/158645 A1 | 11/2012 |

OTHER PUBLICATIONS

[No Author Listed], The HLB system: a time-saving guide to emulsifier selection. ICI Americas Inc. 1976. 22 pages.

ADM, Evolution Chemicals E5789-117 Description. Jun. 2014.

Brost et al., Surfactants assist water-in-oil monitoring by fluroescence. World Oil. Oct. 2008;229(10):12 pages.

Champagne et al., Critical assessment of microemulsion technology for enhancing fluid recovery from tight gas formations and propped fractures. SPE European Formation Damage Conference. Noordwijk, The Netherlands. Jun. 7-10, 2011. SPE-144095. 10 pages.

Crafton et al., Micro-emulsion effectiveness for twenty four wells, eastern green river, wyoming. 2009 SPE Rocky Mountain Petroleum Technology Conference. Denver, Colorado, USA, Apr. 14-16, 2009. SPE-123280. 13 pages.

Haw, The HLB system: a time saving guide to surfactant selection. Presentation to the Midwest chapter of the society of cosmetic chemists. Uniqema. Mar. 9, 2004. 39 slides.

Howard et al., Comparison of flowback aids: understanding their capillary pressure and wetting properties. SPE Production & Operations. Aug. 2010;:376-87.

Kunieda et al. Evaluation of hydrophile-lipophile balance (HLB) of nonionic surfactants. J Colloid and Interface Sci. Sep. 1985;107(1):107-21.

Yang et al., Optimizing nanoemulsions as fluid flowback additives in enhancing tight gas production. J Petroleum Sci Eng. 2014;121:122-5.

(56) References Cited

OTHER PUBLICATIONS

Zelenev et al., Microemulsion technology for improved fluid recovery and enhanced core permeability to gas. 2009 SPE European Formation Damage Conference. Scheveningen, The Netherlands. May 27-29, 2009. SPE 122109. 13 pages.

Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.

Zelenev, Surface energy of north American shales and its role in interaction of shale with surfactants and microemulsions. SPE International Symposium on Oilfield Chemistry. The Woodlands, Texas, USA. Apr. 11-13, 2011, SPE-141459. 7 pages.

* cited by examiner

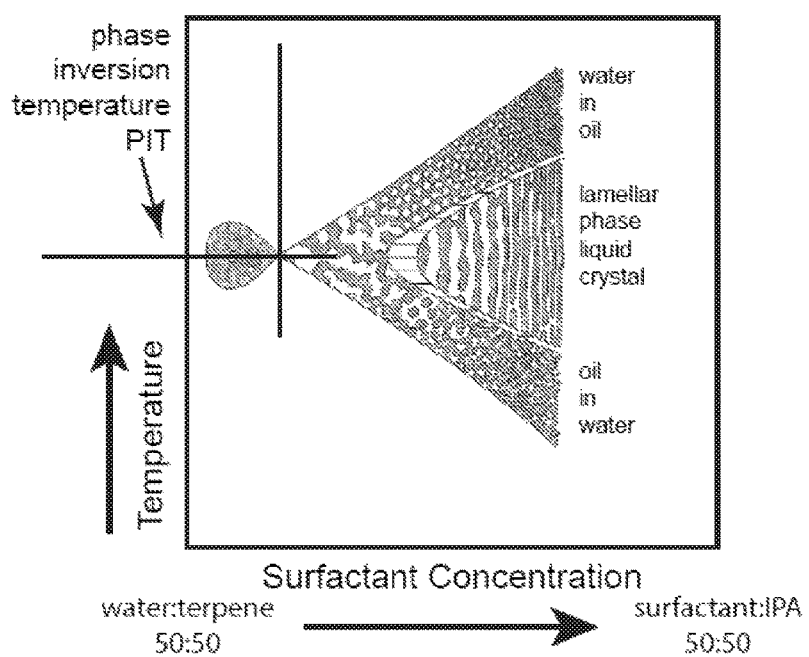

METHODS AND COMPOSITIONS FOR STIMULATING THE PRODUCTION OF HYDROCARBONS FROM SUBTERRANEAN FORMATIONS

RELATED APPLICATIONS

This application is a continuation of, claims priority to U.S. application Ser. No. 13/918,155, filed Jun. 14, 2013, which is incorporated herein by reference in its entirety.

FIELD OF INVENTION

The present invention generally provides methods and compositions for stimulating the production of hydrocarbons (e.g., formation crude oil and/or formation gas) from subterranean formations.

BACKGROUND OF INVENTION

For many years, petroleum has been recovered from subterranean reservoirs through the use of drilled wells and production equipment. During the production of desirable hydrocarbons, such as crude oil and natural gas, a number of other naturally occurring substances may also be encountered within the subterranean environment. The term "stimulation" generally refers to the treatment of geological formations to improve the recovery of liquid hydrocarbons (e.g., formation crude oil and/or formation gas). Common stimulation techniques include well fracturing, slickwater, and acidizing operations.

Oil and natural gas are found in, and produced from, porous and permeable subterranean formations. The porosity and permeability of the formation determine its ability to store hydrocarbons, and the facility with which the hydrocarbons can be extracted from the formation. Hydraulic fracturing is commonly used to stimulate low permeability geological formations to improve the recovery of hydrocarbons. The process can involve suspending chemical agents in a well-treatment fluid (e.g., fracturing fluid) and injecting the fluid down the wellbore. However, the assortment of chemicals pumped down the well can cause damage to the surrounding formation by entering the reservoir rock and blocking the pore throats. It is known that fluid invasion can have a detrimental effect on gas permeability and can impair well productivity. In addition, fluids may become trapped in the formation due to capillary end effects in and around the vicinity of the formation fractures.

In efforts to reduce phase trapping, additives have been incorporated into well-treatment fluids. Generally, the composition of additives comprises multi-component chemical substances and compositions that contain mutually distributed nanodomains of normally immiscible solvents, such as water and hydrocarbon-based organic solvents, stabilized by surfactants (e.g., microemulsions). The incorporation of additives into well-treatment fluids can increase crude oil or formation gas, for example by reducing capillary pressure and/or minimizing capillary end effects.

Although a number of additives are known in the art, there is a continued need for more effective additives for increasing crude oil or formation gas for wellbore remediation, drilling operations, and formation stimulation.

SUMMARY OF INVENTION

Methods and compositions for stimulating the production of hydrocarbons (e.g., formation crude oil and/or formation gas) from subterranean formations are provided.

In some embodiments, a method of selecting a composition for treating an oil or gas well having a wellbore is provided comprising determining whether displacement of residual aqueous treatment fluid by formation crude oil or displacement of residual aqueous treatment fluid by formation gas is preferentially stimulated for the oil or gas well having a wellbore; and selecting an emulsion or a microemulsion for injection into the wellbore to increase formation crude oil or formation gas production by the well, wherein the emulsion or the microemulsion comprises water, at least a first type of solvent, and a surfactant, wherein the solvent is selected from the group consisting of unsubstituted cyclic or acyclic, branched or unbranched alkanes having 6-12 carbon atoms, unsubstituted acyclic branched or unbranched alkenes having one or two double bonds and 6-12 carbon atoms, cyclic or acyclic, branched or unbranched alkanes having 9-12 carbon atoms and substituted with only an —OH group, branched or unbranched dialkylether compounds having the formula $C_nH_{2n+1}OC_mH_{2m+1}$, wherein n+m is between 6 and 16, and aromatic solvents having a boiling point between about 300-400° F., when displacement of residual aqueous treatment fluid by formation crude oil is preferentially stimulated; or wherein the solvent is selected from the group consisting of cyclic or acyclic, branched or unbranched alkanes having 8 carbon atoms and substituted with only an —OH group and aromatic solvents having a boiling point between about 175-300° F., when displacement of residual aqueous treatment fluid by formation gas is preferentially stimulated.

In some embodiments, a method of treating an oil or gas well having a wellbore is provided comprising injecting an emulsion or a microemulsion into the wellbore of the oil or gas well to stimulate displacement of residual aqueous treatment fluid by formation crude oil and increase production of formation crude oil by the well, wherein the emulsion or the microemulsion comprises water, at least a first type of solvent, and a surfactant; and wherein the solvent is selected from the group consisting of unsubstituted cyclic or acyclic, branched or unbranched alkanes having 6-12 carbon atoms, unsubstituted acyclic branched or unbranched alkenes having one or two double bonds and 6-12 carbon atoms, cyclic or acyclic, branched or unbranched alkanes having 9-12 carbon atoms and substituted with only an —OH group, branched or unbranched dialkylether compounds having the formula $C_nH_{2n+1}OC_mH_{2m+1}$, wherein n+m is between 6 and 16, and aromatic solvents having a boiling point between about 300-400° F.

In some embodiments, a method of treating an oil or gas well having a wellbore is provided comprising injecting an emulsion or a microemulsion into the wellbore of the oil or gas well to stimulate displacement of residual aqueous treatment fluid by formation gas and increase production of formation gas by the well, wherein the emulsion or the microemulsion comprises water, at least a first type of solvent, and a surfactant; and wherein the solvent is selected from the group consisting of cyclic or acyclic, branched or unbranched alkanes having 8 carbon atoms and substituted with only an —OH group and aromatic solvents having a boiling point between about 175-300° F.

In some embodiments, a composition for injecting into a wellbore is provided comprising an aqueous carrier fluid and an emulsion or a microemulsion, wherein the emulsion or the microemulsion is present in an amount between about 0.1 wt % and about 2 wt % versus the total composition, and wherein the emulsion or microemulsion comprises an aqueous phase, a surfactant, a freezing point depression agent, and a solvent comprising an alpha-olefin.

Other aspects, embodiments, and features of the invention will become apparent from the following detailed description when considered in conjunction with the accompanying drawings. All patent applications and patents incorporated herein by reference are incorporated by reference in their entirety. In case of conflict, the present specification, including definitions, will control.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1 shows an exemplary plot for determining the phase inversion temperature of a microemulsion, according to some embodiments.

DETAILED DESCRIPTION

The present invention generally relates to methods and well-treatment compositions (e.g., emulsions or microemulsions) for stimulating of the production of hydrocarbons (e.g., formation crude oil and/or formation gas) from subterranean formations. In some embodiments, the compositions comprise an emulsion or a microemulsion, as described in more detail herein. The emulsions or the microemulsions may include water, a solvent, a surfactant, and optionally a freezing point depression agent or other components. In some embodiments, the solvent comprises more than one type of solvent (e.g., a first type of solvent and a second type of solvent). In some embodiments, the methods relate to stimulating displacement of residual aqueous treatment fluid by formation crude oil or formation gas to increase production of liquid hydrocarbons, as described in more detail below. In some embodiments, methods of selecting an emulsion or a microemulsion comprising a solvent are provided, wherein the emulsion or the microemulsion is selected so as to increase liquid hydrocarbon production. In other embodiments, methods of selecting an emulsion or a microemulsion comprising a solvent are provided, wherein the emulsion or the microemulsion is selected so as to increase gaseous hydrocarbon production. In some embodiments, the solvent is a hydrocarbon solvent comprising between 6 and 12 carbon atoms. The hydrocarbon may be a linear, branched, or cyclic hydrocarbon, including aromatics, and may be optionally substituted with various functional groups, as described herein.

As described herein, in some embodiments, the inventors have found that microemulsions or emulsions comprising certain solvents increase the displacement (e.g., flowback) of residual aqueous treatment fluid by liquid hydrocarbons (e.g., crude oil) as compared to other solvents. In other embodiments, emulsions or microemulsions comprising certain solvents increase the displacement of residual aqueous treatment fluid by gaseous hydrocarbons as compared to other solvents. Laboratory tests may be conducted, as described herein, to determine the displacement of residual aqueous treatment fluid by liquid hydrocarbons and/or gaseous hydrocarbons of an emulsion or a microemulsion Petroleum is generally recovered from subterranean reservoirs through the use of drilled wells and production equipment. Wells are "stimulated" using various treatments (e.g., fracturing, acidizing) of geological formations to improve the recovery of liquid hydrocarbons. Oil and natural gas are found in, and produced from, porous and permeable subterranean formations. Based on techniques known in the art, as well as the preference for the desired product isolated (e.g., formation crude oil or formation gas), it may be preferential to stimulate either crude oil production or gas production from each well. A well drilled into a subterranean formation may penetrate formations containing liquid or gaseous hydrocarbons or both, as well as connate water or brine. The gas-to-oil ratio is termed the GOR. The operator of the well may choose to complete the well in such a way as to produce (for example) predominantly liquid hydrocarbons (crude oil). Alternatively, the operator may be fracturing a tight formation containing predominantly gaseous hydrocarbons.

Incorporation of the emulsions or the microemulsions described herein (e.g., comprising water, a solvent, and a surfactant) into well-treatment fluids (e.g., fracturing fluids) can aid in reducing fluid trapping, for example, by reducing capillary pressure and/or minimizing capillary end effects. In addition, incorporation of the emulsions or the microemulsions described herein into well-treatment fluids can promote increased flowback of aqueous phases following well treatment, and thus, increase production of liquid and/or gaseous hydrocarbons. That is, incorporation of an emulsion or a microemulsion described herein can aid in the displacement of residual aqueous treatment fluid by formation crude oil and/or formation gas. Residual aqueous treatment fluids may include those fluids pumped into the well, as well as residual aqueous fluids originally present in the well.

In some embodiments, methods of treating an oil or gas well are provided. In some embodiments, the methods comprise injecting an emulsion or a microemulsion into the wellbore of the oil or gas well to stimulate displacement of residual aqueous treatment fluid by formation crude oil or formation gas, and increase production of liquid or gaseous hydrocarbons by the well.

In some embodiments, methods are provided for selecting a composition for treating an oil or gas well. The inventors have discovered that certain solvents are more effective at stimulating displacement of residual aqueous treatment fluid by formation crude oil and others are more effective for stimulating displacement of residual aqueous treatment fluid by formation gas for the oil or gas well.

It should be understood, that in embodiments where a microemulsion is said to be injected into a wellbore, that the microemulsion may be diluted and/or combined with other liquid component(s) prior to and/or during injection. For example, in some embodiments, the microemulsion is diluted with an aqueous carrier fluid (e.g., water, brine, sea water, fresh water, or a well-treatment fluid (e.g., an acid, a fracturing fluid comprising polymers, sand, etc., slickwater) prior to and/or during injection into the wellbore. In some embodiments, a composition for injecting into a wellbore is provided comprising a microemulsion as described herein and an aqueous carrier fluid, wherein the microemulsion is present in an amount between about 0.1 and about 50 gallons per thousand gallons of dilution fluid ("gpt"), or between about 0.5 and about 10 gpt, or between about 0.5 and about 2 gpt.

In some embodiments, emulsions or microemulsion are provided. The terms should be understood to include emulsions or microemulsions that have a water continuous phase, or that have an oil continuous phase, or microemulsions that are bicontinuous.

As used herein, the term "emulsion" is given its ordinary meaning in the art and refers to dispersions of one immiscible liquid in another, in the form of droplets, with diameters approximately in the range of 100-1,000 nanometers. Emulsions may be thermodynamically unstable and/or require high shear forces to induce their formation.

As used herein, the term "microemulsion" is given its ordinary meaning in the art and refers to dispersions of one immiscible liquid in another, in the form of droplets, with diameters approximately in the range of about 10-100 nanometers. Microemulsions are clear or transparent because they contain particles smaller than the wavelength of visible light. In addition, microemulsions are homogeneous thermodynamically stable single phases, and form spontaneously, and thus, differ markedly from thermodynamically unstable emulsions, which generally depend upon intense mixing energy for their formation. Microemulsions may be characterized by a variety of advantageous properties including, by not limited to, (i) clarity, (ii) very small particle size, (iii) ultra-low interfacial tensions, (iv) the ability to combine properties of water and oil in a single homogeneous fluid, (v) shelf stability, and (vi) ease of preparation.

It should be understood, that while much of the description herein focuses on microemulsions, this is by no means limiting, and emulsions may be employed where appropriate.

In some embodiments, a microemulsion comprises water, a solvent, and a surfactant. In some embodiments, the microemulsion may further comprise additional components, for example, a freezing point depression agent. Details of each of the components of the microemulsions are described in detail herein. In some embodiments, the components of the microemulsions are selected so as to reduce or eliminate the hazards of the microemulsion to the environment and/or the subterranean reservoirs.

The microemulsion generally comprises a solvent. The solvent, or a combination of solvents, may be present in the microemulsion in any suitable amount. In some embodiments, the total amount of solvent present in the microemulsion is between about 2 wt % and about 60 wt %, or between about 5 wt % and about 40 wt %, or between about 5 wt % and about 30 wt %, versus the total microemulsion composition.

The water to solvent ratio in a microemulsion may be varied. In some embodiments, the ratio of water to solvent, along with other parameters of the solvent, may be varied so that displacement of residual aqueous treatment fluid by formation gas and/or formation crude is preferentially stimulated. In some embodiments, the ratio of water to solvent is between about 15:1 and 1:10, or between 9:1 and 1:4, or between 3.2:1 and 1:4.

In some embodiments, when displacement of residual aqueous treatment fluid by formation crude oil is preferentially stimulated, the solvent is selected from the group consisting of unsubstituted cyclic or acyclic, branched or unbranched alkanes having 6-12 carbon atoms, unsubstituted acyclic branched or unbranched alkenes having one or two double bonds and 6-12 carbon atoms, cyclic or acyclic, branched or unbranched alkanes having 9-12 carbon atoms and substituted with only an —OH group, branched or unbranched dialkylether compounds having the formula $C_nH_{2n+1}OC_mH_{2m+1}$, wherein n+m is between 6 and 16, and aromatic solvents having a boiling point between about 300-400° F.

In some embodiments, the solvent is an unsubstituted cyclic or acyclic, branched or unbranched alkane having 6-12 carbon atoms. In some embodiments, the cyclic or acyclic, branched or unbranched alkane has 6-10 carbon atoms. Non-limiting examples of unsubstituted acyclic unbranched alkanes having 6-12 carbon atoms include hexane, heptane, octane, nonane, decane, undecane, and dodecane. Non-limiting examples of unsubstituted acyclic branched alkanes having 6-12 carbon atoms include isomers of methylpentane (e.g., 2-methylpentane, 3-methylpentane), isomers of dimethylbutane (e.g., 2,2-dimethylbutane, 2,3-dimethylbutane), isomers of methylhexane (e.g., 2-methylhexane, 3-methylhexane), isomers of ethylpentane (e.g., 3-ethylpentane), isomers of dimethylpentane (e.g., 2,2,-dimethylpentane, 2,3-dimethylpentane, 2,4-dimethylpentane, 3,3-dimethylpentane), isomers of trimethylbutane (e.g., 2,2,3-trimethylbutane), isomers of methylheptane (e.g., 2-methylheptane, 3-methylheptane, 4-methylheptane), isomers of dimethylhexane (e.g., 2,2-dimethylhexane, 2,3-dimethylhexane, 2,4-dimethylhexane, 2,5-dimethylhexane, 3,3-dimethylhexane, 3,4-dimethylhexane), isomers of ethylhexane (e.g., 3-ethylhexane), isomers of trimethylpentane (e.g., 2,2,3-trimethylpentane, 2,2,4-trimethylpentane, 2,3,3-trimethylpentane, 2,3,4-trimethylpentane), and isomers of ethylmethylpentane (e.g., 3-ethyl-2-methylpentane, 3-ethyl-3-methylpentane). Non-limiting examples of unsubstituted cyclic branched or unbranched alkanes having 6-12 carbon atoms, include cyclohexane, methylcyclopentane, ethylcyclobutane, propylcyclopropane, isopropylcyclopropane, dimethylcyclobutane, cycloheptane, methylcyclohexane, dimethylcyclopentane, ethylcyclopentane, trimethylcyclobutane, cyclooctane, methylcycloheptane, dimethylcyclohexane, ethylcyclohexane, cyclononane, methylcyclooctane, dimethylcycloheptane, ethylcycloheptane, trimethylcyclohexane, ethylmethylcyclohexane, propylcyclohexane, and cyclodecane. In a particular embodiment, the unsubstituted cyclic or acyclic, branched or unbranched alkane having 6-12 carbon is selected from the group consisting of heptane, octane, nonane, decane, 2,2,4-trimethylpentane (isooctane), and propylcyclohexane.

In some embodiments, the solvent is an unsubstituted acyclic branched or unbranched alkene having one or two double bonds and 6-12 carbon atoms. In some embodiments, the solvent is an unsubstituted acyclic branched or unbranched alkene having one or two double bonds and 6-10 carbon atoms. Non-limiting examples of unsubstituted acyclic unbranched alkenes having one or two double bonds and 6-12 carbon atoms include isomers of hexene (e.g., 1-hexene, 2-hexene), isomers of hexadiene (e.g., 1,3-hexadiene, 1,4-hexadiene), isomers of heptene (e.g., 1-heptene, 2-heptene, 3-heptene), isomers of heptadiene (e.g., 1,5-heptadiene, 1-6, heptadiene), isomers of octene (e.g., 1-octene, 2-octene, 3-octene), isomers of octadiene (e.g., 1,7-octadiene), isomers of nonene, isomers of nonadiene, isomers of decene, isomers of decadiene, isomers of undecene, isomers of undecadiene, isomers of dodecene, and isomers of dodecadiene. In some embodiments, the acyclic unbranched alkene having one or two double bonds and 6-12 carbon atoms is an alpha-olefin (e.g., 1-hexene, 1-heptene, 1-octene, 1-nonene, 1-decene, 1-undecene, 1-dodecene). Non-limiting examples unsubstituted acyclic branched alkenes include isomers of methylpentene, isomers of dimethylpentene, isomers of ethylpentene, isomers of methylethylpentene, isomers of propylpentene, isomers of methylhexene, isomers of ethylhexene, isomers of dimethylhexene, isomers of methylethylhexene, isomers of methylheptene, isomers of ethylheptene, isomers of dimethylhexptene, and isomers of methylethylheptene. In a particular embodiment, the unsubstituted acyclic unbranched alkene having one or two double bonds and 6-12 carbon atoms is selected from the group consisting of 1-octene and 1,7-octadiene.

In some embodiments, the solvent is a cyclic or acyclic, branched or unbranched alkane having 9-12 carbon atoms and substituted with only an —OH group. Non-limiting examples of cyclic or acyclic, branched or unbranched alkanes having 9-12 carbon atoms and substituted with only an —OH group include isomers of nonanol, isomers of decanol, isomers of undecanol, and isomers of dodecanol. In a particular embodiment, the cyclic or acyclic, branched or unbranched alkane having 9-12 carbon atoms and substituted with only an —OH group is selected from the group consisting of 1-nonanol and 1-decanol.

In some embodiments, the solvent is a branched or unbranched dialkylether compound having the formula $C_nH_{2n+1}OC_mH_{2m+1}$ wherein n+m is between 6 and 16. In some cases, n+m is between 6 and 12, or between 6 and 10, or between 6 and 8. Non-limiting examples of branched or unbranched dialkylether compounds having the formula $C_nH_{2n+1}OC_mH_{2m+1}$ include isomers of $C_3H_7OC_3H_7$, isomers of $C_4H_9OC_3H_7$, isomers of $C_5H_{11}OC_3H_7$, isomers of $C_3H_7OC_3H_7$, isomers of $C_4H_9OC_4H_9$, isomers of $C_4H_9OC_5H_{11}$, isomers of $C_4H_9OC_6H_{13}$, isomers of $C_5H_{11}OC_6H_{13}$, and isomers of $C_6H_{13}OC_6H_{13}$. In a particular embodiment, the branched or unbranched dialklyether is an isomer $C_6H_{13}OC_6H_{13}$ (e.g., dihexylether).

In some embodiments, the solvent is an aromatic solvent having a boiling point between about 300-400° F. Non-limiting examples of aromatic solvents having a boiling point between about 300-400° F. include butylbenzene, hexylbenzene, mesitylene, light aromatic naphtha, and heavy aromatic naphtha.

In other embodiments, when displacement of residual aqueous treatment fluid by formation gas is preferentially stimulated, the solvent is selected from the group consisting of cyclic or acyclic, branched or unbranched alkanes having 8 carbon atoms and substituted only with an —OH group and aromatic solvents having a boiling point between about 175-300° F.

In some embodiments, the solvent is a cyclic or acyclic, branched or unbranched alkane having 8 carbon atoms and substituted with only an —OH group. Non-limiting examples of cyclic or acyclic, branched or unbranched alkanes having 8 carbon atoms and substituted with only an —OH group include isomers of octanol (e.g., 1-octanol, 2-octanol, 3-octanol, 4-octanol), isomers of methyl heptanol, isomers of ethylhexanol (e.g., 2-ethyl-1-hexanol, 3-ethyl-1-hexanol, 4-ethyl-1-hexanol), isomers of dimethylhexanol, isomers of propylpentanol, isomers of methylethylpentanol, and isomers of trimethylpentanol. In a particular embodiment, the cyclic or acyclic, branched or unbranched alkane having 8 carbon atoms and substituted with only an —OH group is selected from the group consisting of 1-octanol and 2-ethyl-1-hexanol.

In some embodiments, the solvent is an aromatic solvent having a boiling point between about 175-300° F. Non-limiting examples of aromatic liquid solvents having a boiling point between about 175-300° F. include benzene, xylenes, and toluene. In a particular embodiment, the solvent is not xylene.

In some embodiments, the microemulsion comprises a first type of solvent and a second type of solvent. The first type of solvent to the second type of solvent ratio in a microemulsion may be present in any suitable ratio. In some embodiments, the ratio of the first type of solvent to the second type of solvent is between about 4:1 and 1:4, or between 2:1 and 1:2, or about 1:1.

In some cases, when displacement of residual aqueous treatment fluid by formation crude oil is preferentially stimulated, the first type of solvent and the second type of solvent are different and are selected from the group consisting of unsubstituted cyclic or acyclic, branched or unbranched alkanes having 6-12 carbon atoms, unsubstituted acyclic branched or unbranched alkenes having one or two double bonds and 6-12 carbon atoms, cyclic or acyclic, branched or unbranched alkanes having 9-12 carbon atoms and substituted with only an —OH group, branched or unbranched dialkylether compounds having the formula $C_nH_{2n+1}OC_mH_{2m+1}$, wherein n+m is between 6 and 16, and aromatic solvents having a boiling point between about 300-400° F. In other embodiments, when displacement of residual aqueous treatment fluid by formation gas is preferentially stimulated, the first type of solvent and the second type of solvent are different and are selected from the group consisting of cyclic or acyclic, branched or unbranched alkanes having 8 carbon atoms and substituted with only an —OH group and aromatic solvents having a boiling point between about 175-300° F.

In some embodiments, at least one solvent present in the microemulsion is a terpene or terpenoid. In some cases, when displacement of residual aqueous treatment fluid by formation crude oil is preferentially stimulated, the first type of solvent is selected from the group consisting of unsubstituted cyclic or acyclic, branched or unbranched alkanes having 6-12 carbon atoms, unsubstituted acyclic branched or unbranched alkenes having one or two double bonds and 6-12 carbon atoms, cyclic or acyclic, branched or unbranched alkanes having 9-12 carbon atoms and substituted with only an —OH group, branched or unbranched dialkylether compounds having the formula $C_nH_{2n+1}OC_mH_{2m+1}$, wherein n+m is between 6 and 16, and aromatic solvents having a boiling point between about 300-400° F. and the second type of solvent is a terpene or terpenoid. In some cases, the terpene or terpenoid may be selected so as to preferentially stimulate displacement of residual aqueous treatment fluid by formation crude oil. In such embodiments, the terpene or terpenoid for preferentially stimulating displacement of residual aqueous treatment fluid by formation crude oil may have a phase inversion temperature greater than 109.4° F., as determined by the method described herein.

In other embodiments, when displacement of residual aqueous treatment fluid by formation gas is preferentially stimulated, the first type of solvent is selected from the group consisting of cyclic or acyclic, branched or unbranched alkanes having 8 carbon atoms and substituted with only an —OH group and aromatic solvents having a boiling point between about 175-300° F. and the second type of solvent is a terpene or terpenoid. In some cases, the terpene or terpenoid may be selected so as to preferentially stimulate displacement of residual aqueous treatment fluid by formation gas. In such embodiments, the terpene or terpenoid for preferentially stimulating displacement of residual aqueous treatment fluid by formation gas may have a phase inversion temperature less than 109.4° F., as determined by the method described herein.

Those of ordinary skill in the art will appreciate that microemulsions comprising more than two types of solvents may be utilized in the methods, compositions, and systems described herein. For example, the microemulsion may comprise more than one or two types of solvent, for example, three, four, five, six, or more, types of solvents. As a non-limiting example, when displacement of residual aqueous treatment fluid by formation crude oil is preferentially stimulated, the microemulsion may comprise one or more solvents selected from the group consisting of unsubstituted cyclic or acyclic, branched or unbranched alkanes having 6-12 carbon atoms, unsubstituted acyclic branched or unbranched alkenes having one or two double bonds and 6-12 carbon atoms, cyclic or acyclic, branched or unbranched alkanes having 9-12 carbon atoms and substituted with only an —OH group, branched or unbranched dialkylether compounds having the formula $C_nH_{2n+1}OC_mH_{2m+1}$, wherein n+m is between 6 and 16, and aromatic solvents having a boiling point between about 300-400° F. and one or more terpenes or terpenoids. As another non-limiting example, when displacement of residual aqueous treatment fluid by formation gas is preferentially stimulated, the microemulsion may comprise one or more solvents selected from the group consisting of cyclic or acyclic, branched or unbranched alkanes having 8 carbon atoms and substituted with only an —OH group and aromatic solvents having a boiling point between about 175-300° F. and one or more terpenes or terpenoids.

In some embodiments, at least one of the solvents present in the microemulsion is a terpene or a terpenoid. In some embodiments, the terpene or terpenoid comprises a first type of terpene or terpenoid and a second type of terpene or terpenoid. Terpenes may be generally classified as monoterpenes (e.g., having two isoprene units), sesquiterpenes (e.g., having 3 isoprene units), diterpenes, or the like. The term terpenoid also includes natural degradation products, such as ionones, and natural and synthetic derivatives, e.g., terpene alcohols, aldehydes, ketones, acids, esters, epoxides, and hydrogenation products (e.g., see Ullmann's Encyclopedia of Industrial Chemistry, 2012, pages 29-45, herein incorporated by reference). It should be understood, that while much of the description herein focuses on terpenes, this is by no means limiting, and terpenoids may be employed where appropriate.

In some embodiments, the terpene is a monoterpene. Monoterpenes may be further classified as acyclic, monocyclic, and bicyclic [18-20], as well as whether the monoterpene comprises one or more oxygen atoms (e.g., alcohol groups, ester groups, carbonyl groups, etc.). In some embodiments, the terpene comprises an alcohol group. Non-limiting examples of terpenes comprising an alcohol group are linalool, geraniol, nopol, α-terpineol, and menthol. In some embodiments, the terpene comprises an ether-oxygen, for example, eucalyptol, or a carbonyl oxygen, for example, menthone. In some embodiments, the terpene does not comprise an oxygen atom, for example, d-limonene.

Non-limiting examples of terpenes include linalool, geraniol, nopol, α-terpineol, menthol, eucalyptol, menthone, d-limonene, terpinolene, β-occimene, γ-terpinene, α-pinene, and citronellene. In a particular embodiment, the terpene is selected from the group consisting of α-terpeneol, α-pinene, nopol, and eucalyptol. In one embodiment, the terpene is nopol. In another embodiment, the terpene is eucalyptol. In some embodiments, the terpene is not limonene (e.g., d-limonene). In some embodiments, the emulsion is free of limonene In some embodiments, the terpene may be classified in terms of its phase inversion temperature ("PIT"). The term "phase inversion temperature" is given its ordinary meaning in the art and refers to the temperature at which an oil in water microemulsion inverts to a water in oil microemulsion (or vice versa). Those of ordinary skill in the art will be aware of methods for determining the PIT for a microemulsion comprising a terpene (e.g., see Strey, Colloid & Polymer Science, 1994. 272(8): p. 1005-1019; Kahlweit et al., Angewandte Chemie International Edition in English, 1985. 24(8): p. 654-668). The PIT values described herein were determined using a 1:1 ratio of terpene (e.g., one or more terpenes):de-ionized water and varying amounts (e.g., between about 20 wt % and about 60 wt %; generally, between 3 and 9 different amounts are employed) of a 1:1 blend of surfactant comprising linear $C_{12}$-$C_{15}$ alcohol ethoxylates with on average 7 moles of ethylene oxide (e.g., Neodol 25-7):isopropyl alcohol wherein the upper and lower temperature boundaries of the microemulsion region can be determined and a phase diagram may be generated. Those of ordinary skill in the art will recognize that such a phase diagram (e.g., a plot of temperature against surfactant concentration at a constant oil-to-water ratio) may be referred to as "fish" diagram or a Kahlweit plot. The temperature at the vertex is the PIT. An exemplary fish diagram indicating the PIT is shown in FIG. 1. PITs for non-limiting examples of terpenes determined using this experimental procedure outlined above are given in Table 1.

TABLE 1

Phase inversion temperatures for non-limiting examples of terpenes.

| Terpene | Phase Inversion Temperature ° F. (° C.) |
|---|---|
| linalool | 24.8 (−4) |
| geraniol | 31.1 (−0.5) |
| nopol | 36.5 (2.5) |
| α-terpineol | 40.3 (4.6) |
| menthol | 60.8 (16) |
| eucalyptol | 87.8 (31) |
| menthone | 89.6 (32) |
| d-limonene | 109.4 (43) |
| terpinolene | 118.4 (48) |
| β-occimene | 120.2 (49) |
| γ-terpinene | 120.2 (49) |
| α-pinene | 134.6 (57) |
| citronellene | 136.4 (58) |

In some embodiments, the terpene has a PIT greater than and/or less than 109.4° F., as determined by the method described herein. In some embodiments, the terpene has a PIT greater than 109.4° F., as determined by the method described herein. In some embodiments, the terpene has a PIT less than 109.4° F., as determined by the method described herein. In some embodiments, the terpene has a PIT greater than 89.6° F., as determined by the method described herein. In some embodiments, the terpene has a PIT less than 89.6 F as determined by the method described herein. In some embodiments, the PIT is between about 14° F. and about 158° F., or between about 24.8° F. and about 140° F., as determined by the method described herein. In some embodiments, the minimum PIT is 14° F., or 24.8° F., as determined by the method described herein. In some embodiments, the maximum PIT is 158° F., or 140° F., as determined by the method described herein.

In some embodiments, if displacement of residual aqueous treatment fluid by formation crude oil is preferentially stimulated and the emulsion or the microemulsion comprises water, a first type of solvent (e.g., as described above), and a terpene, then the terpene may be selected to have a phase inversion temperature greater than 109.4° F., as determined by the method described herein. Alternatively, if displacement of residual aqueous treatment fluid by formation gas is preferentially stimulated and the emulsion or the microemulsion comprises water, a first type of solvent (e.g., as described herein), and a terpene, then the terpene may be selected to have a phase inversion temperature less than 109.4° F., as determined by the method described herein In some embodiments, the microemulsion comprises a surfactant. The microemulsion may comprise a single surfactant or a combination of two or more surfactants. For example, in some embodiments, the surfactant comprises a first type of surfactant and a second type of surfactant. The term "surfactant," as used herein, is given its ordinary meaning in the art and refers to compounds having an amphiphilic structure which gives them a specific affinity for oil/water-type and water/oil-type interfaces which helps the compounds to reduce the free energy of these interfaces and to stabilize the dispersed phase of a microemulsion. The term surfactant encompasses cationic surfactants, anionic surfactants, amphoteric surfactants, nonionic surfactants, zwitterionic surfactants, and mixtures thereof. In some embodiments, the surfactant is a nonionic surfactant. Nonionic surfactants generally do not contain any charges. Amphoteric surfactants generally have both positive and negative charges, however, the net charge of the surfactant can be positive, negative, or neutral, depending on the pH of the solution. Anionic surfactants generally possess a net negative charge. Cationic surfactants generally possess a net positive charge.

Suitable surfactants for use with the compositions and methods described herein will be known in the art. In some embodiments, the surfactant is an alkyl polyglycol ether, for example, having 2-40 ethylene oxide (EO) units and alkyl groups of 4-20 carbon atoms. In some embodiments, the surfactant is an alkylaryl polyglycol ether having 2-40 EO units and 8-20 carbon atoms in the alkyl and aryl groups. In some embodiments, the surfactant is an ethylene oxide/propylene oxide (EO/PO) block copolymer having 8-40 EO or PO units. In some embodiments, the surfactant is a fatty acid polyglycol ester having 6-24 carbon atoms and 2-40 EO units. In some embodiments, the surfactant is a polyglycol ether of hydroxyl-containing triglycerides (e.g., castor oil). In some embodiments, the surfactant is an alkylpolyglycoside of the general formula R"—O—$Z_n$, where R" denotes a linear or branched, saturated or unsaturated alkyl group having on average 8-24 carbon atoms and $Z_n$ denotes an oligoglycoside group having on average n=1-10 hexose or pentose units or mixtures thereof. In some embodiments, the surfactant is a fatty ester of glycerol, sorbitol, or pentaerythritol. In some embodiments, the surfactant is an amine oxide (e.g., dodecyldimethylamine oxide). In some embodiments, the surfactant is an alkyl sulfate, for example having a chain length of 8-18 carbon atoms, alkyl ether sulfates having 8-18 carbon atoms in the hydrophobic group and 1-40 ethylene oxide (EO) or propylene oxide (PO) units. In some embodiments, the surfactant is a sulfonate, for example, an alkyl sulfonate having 8-18 carbon atoms, an alkylaryl sulfonate having 8-18 carbon atoms, an ester or half ester of sulfosuccinic acid with monohydric alcohols or alkylphenols having 4-15 carbon atoms. In some cases, the alcohol or alkylphenol can also be ethoxylated with 1-40 EO units. In some embodiments, the surfactant is an alkali metal salt or ammonium salt of a carboxylic acid or poly(alkylene glycol) ether carboxylic acid having 8-20 carbon atoms in the alkyl, aryl, alkaryl or aralkyl group and 1-40 EO or PO units. In some embodiments, the surfactant is a partial phosphoric ester or the corresponding alkali metal salt or ammonium salt, e.g. an alkyl and alkaryl phosphate having 8-20 carbon atoms in the organic group, an alkylether phosphate or alkarylether phosphate having 8-20 carbon atoms in the alkyl or alkaryl group and 1-40 EO units. In some embodiments, the surfactant is a salt of primary, secondary, or tertiary fatty amine having 8-24 carbon atoms with acetic acid, sulfuric acid, hydrochloric acid, and phosphoric acid. In some embodiments, the surfactant is a quaternary alkyl- and alkylbenzylammonium salt, whose alkyl groups have 1-24 carbon atoms (e.g., a halide, sulfate, phosphate, acetate, or hydroxide salt). In some embodiments, the surfactant is an alkylpyridinium, an alkylimidazolinium, or an alkyloxazolinium salt whose alkyl chain has up to 18 carbons atoms (e.g., a halide, sulfate, phosphate, acetate, or hydroxide salt). In some embodiments, the surfactant is amphoteric, including sultaines (e.g., cocamidopropyl hydroxysultaine), betaines (e.g., cocamidopropyl betaine), or phosphates (e.g., lecithin). Non-limiting examples of specific surfactants include a linear $C_{12}$-$C_{15}$ ethoxylated alcohols with 5-12 moles of EO, lauryl alcohol ethoxylate with 4-8 moles of EO, nonyl phenol ethoxylate with 5-9 moles of EO, octyl phenol ethoxylate with 5-9 moles of EO, tridecyl alcohol ethoxylate with 5-9 moles of EO, Pluronic® matrix of EO/PO copolymers, ethoxylated cocoamide with 4-8 moles of EO, ethoxylated coco fatty acid with 7-11 moles of EO, and cocoamidopropyl amine oxide.

Those of ordinary skill in the art will be aware of methods and techniques for selecting surfactants for use in the microemulsions described herein. In some cases, the surfactant(s) are matched to and/or optimized for the particular oil or solvent in use. In some embodiments, the surfactant(s) are selected by mapping the phase behavior of the microemulsion and choosing the surfactant(s) that gives the desired range of stability. In some cases, the stability of the microemulsion over a wide range of temperatures is targeted as the microemulsion may be subject to a wide range of temperatures due to the environmental conditions present at the subterranean formation.

The surfactant may be present in the microemulsion in any suitable amount. In some embodiments, the surfactant is present in an amount between about 10 wt % and about 60 wt %, or between about 15 wt % and about 55 wt % versus the total microemulsion composition, or between about 20 wt % and about 50 wt %, versus the total microemulsion composition.

In some embodiments, the microemulsion comprises a freezing point depression agent. The microemulsion may comprise a single freezing point depression agent or a combination of two or more freezing point depression agents. For example, in some embodiments, the freezing point depression agent comprises a first type of freezing point depression agent and a second type of freezing point depression agent. The term "freezing point depression agent" is given its ordinary meaning in the art and refers to a compound which is added to a solution to reduce the freezing point of the solution. That is, a solution comprising the freezing point depression agent has a lower freezing point as compared to an essentially identical solution not comprising the freezing point depression agent. Those of ordinary skill in the art will be aware of suitable freezing point depression agents for use in the microemulsions described herein. Non-limiting examples of freezing point depression agents include primary, secondary, and tertiary alcohols with between 1 and 20 carbon atoms. In some embodiments, the alcohol comprises at least 2 carbon atoms, alkylene glycols including polyalkylene glycols, and salts. Non-limiting examples of alcohols include methanol, ethanol, i-propanol, n-propanol, t-butanol, n-butanol, n-pentanol, n-hexanol, and 2-ethyl-hexanol. In some embodiments, the freezing point depression agent is not methanol (e.g., due to toxicity). Non-limiting examples of alkylene glycols include ethylene glycol (EG), polyethylene glycol (PEG), propylene glycol (PG), and triethylene glycol (TEG). In some embodiments, the freezing point depression agent is not ethylene oxide (e.g., due to toxicity). Non-limiting examples of salts include salts comprising K, Na, Br, Cr, Cr, Cs, or Bi, for example, halides of these metals, including NaCl, KCl, CaCl$_2$, and MgCl. In some embodiments, the freezing point depression agent comprises an alcohol and an alkylene glycol. Another non-limiting example of a freezing point depression agent is a combination of choline chloride and urea. In some embodiments, the microemulsion comprising the freezing point depression agent is stable over a wide range of temperatures, for example, between about −25° F. to 150° F.

The freezing point depression agent may be present in the microemulsion in any suitable amount. In some embodiments, the freezing point depression agent is present in an amount between about 1 wt % and about 40 wt %, or between about 3 wt % and about 20 wt %, or between about 8 wt % and about 16 wt %, versus the total microemulsion composition.

In some embodiments, the components of the microemulsion and/or the amounts of the components may be selected so that the microemulsion is stable over a wide-range of temperatures. For example, the microemulsion may exhibit stability between about −40° F. and about 300° F., or between about −40° F. and about 150° F. Those of ordinary skill in the art will be aware of methods and techniques for determining the range of stability of the microemulsion. For example, the lower boundary may be determined by the freezing point and the upper boundary may be determined by the cloud point and/or using spectroscopy methods. Stability over a wide range of temperatures may be important in embodiments where the microemulsions are being employed in applications comprising environments wherein the temperature may vary significantly, or may have extreme highs (e.g., desert) or lows (e.g., artic).

In some embodiments, emulsions or microemulsions are provided comprising water, a solvent, and a surfactant, wherein the solvents and surfactants may be as described herein. In some embodiments, as described herein, the solvent comprises more than one type of solvent, for example, two, three, four, five, six, or more, types of solvents. In some embodiment, at least one solvent is selected from the group consisting of unsubstituted cyclic or acyclic, branched or unbranched alkanes having 6-12 carbon atoms, unsubstituted acyclic branched or unbranched alkenes having one or two double bonds and 6-12 carbon atoms, cyclic or acyclic, branched or unbranched alkanes having 9-12 carbon atoms and substituted with only an —OH group, branched or unbranched dialkylether compounds having the formula $C_nH_{2n+1}OC_mH_{2m+1}$, wherein n+m is between 6 and 16, and aromatic solvents having a boiling point between about 300-400° F. In another embodiment, at least one solvent is selected from the group consisting of cyclic or acyclic, branched or unbranched alkanes having 8 carbon atoms and substituted with only an —OH group and aromatic solvents having a boiling point between about 175-300° F. In some cases, at least one solvent is a terpene. The microemulsion may further comprise addition components, for example, a freezing point depression agent. In some embodiments, at least one solvent is selected from the group consisting of butylbenzene, heavy aromatic naphtha, light aromatic naphtha, 1-nonanol, propylcyclohexane, 1-decanol, dihexylether, 1,7-octadiene, hexylbenzene, nonane, decane, 1-octene, isooctane, octane, heptane, mesitylene, xylenes, toluene, 2-ethyl-1-hexanol, 1-octanol. In some embodiments, at least one solvent is selected from the group consisting of butylbenzene, heavy aromatic naphtha, light aromatic naphtha, 1-nonanol, propylcyclohexane, 1-decanol, dihexylether, 1,7-octadiene, hexylbenzene, nonane, decane, 1-octene, isooctane, octane, heptane, mesitylene, toluene, 2-ethyl-1-hexanol, 1-octanol. In some embodiments, the at least one solvent is not xylene. In some embodiment, at least one solvent is an alpha-olefin.

In some embodiments, composition for injecting into a wellbore are provided comprising an aqueous carrier fluid, and an emulsion or a microemulsion as described herein, wherein the emulsion or the microemulsion is present in an amount between about 0.1 wt % and about 2 wt % versus the total composition. In some embodiments, the emulsion or microemulsion comprises an aqueous phase, a surfactant, a freezing point depression agent, and a solvent as described herein. In some embodiments, the solvent is as described herein. In some cases, the solvent comprises an alpha-olefin, for example, having between 6-12 carbon atoms. In other cases, the solvent comprises a cyclic or acyclic, branched or unbranched alkane having 8-12, or 9-12, or 8, or 9, or 10, or 11, or 12 carbon atoms and substituted with only an —OH group. In some cases, the total amount of solvent present in the emulsion or microemulsion is between about 2 wt % and about 60 wt % and/or the ratio of the aqueous phase to solvent in the emulsion or microemulsion is between 15:1 and 1:10. In some cases, the composition may comprise more than one type of solvent. In some cases, the solvent comprises an alpha-olefin and a terpene. In some cases, the solvent comprises a cyclic or acyclic, branched or unbranched alkane having 8-12 carbon atoms and substituted with only an —OH group and a terpene.

The microemulsions described herein may be formed using methods known to those of ordinary skill in the art. In some embodiments, the aqueous and non-aqueous phases may be combined (e.g., the water and the solvent(s)), followed by addition of a surfactant(s) and optionally other components (e.g., freezing point depression agent(s)) and agitation. The strength, type, and length of the agitation may be varied as known in the art depending on various factors including the components of the microemulsion, the quantity of the microemulsion, and the resulting type of microemulsion formed. For example, for small samples, a few seconds of gentle mixing can yield a microemulsion, whereas for larger samples, longer agitation times and/or stronger agitation may be required. Agitation may be provided by any suitable source, for example, a vortex mixer, a stirrer (e.g., magnetic stirrer), etc.

Any suitable method for injecting the microemulsion (e.g., a diluted microemulsion) into a wellbore may be employed. For example, in some embodiments, the microemulsion, optionally diluted, may be injected into a subterranean formation by injecting it into a well or wellbore in the zone of interest of the formation and thereafter pressurizing it into the formation for the selected distance. Methods for achieving the placement of a selected quantity of a mixture in a subterranean formation are known in the art. The well may be treated with the microemulsion for a suitable period of time. The microemulsion and/or other fluids may be removed from the well using known techniques, including producing the well.

In some embodiments, experiments may be carried out to determine displacement of residual aqueous treatment fluid by formation crude oil or formation gas by a microemulsion (e.g., a diluted microemulsion). For example, displacement of residual aqueous treatment fluid by formation crude oil may be determined using the method described in Example 2 and/or displacement of residual aqueous treatment fluid by formation gas may be determined using the method described in Example 3.

For convenience, certain terms employed in the specification, examples, and appended claims are listed here.

Definitions of specific functional groups and chemical terms are described in more detail below. For purposes of this invention, the chemical elements are identified in accordance with the Periodic Table of the Elements, CAS version, *Handbook of Chemistry and Physics*, 75th Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito: 1999, the entire contents of which are incorporated herein by reference.

Certain compounds of the present invention may exist in particular geometric or stereoisomeric forms. The present invention contemplates all such compounds, including cis- and trans-isomers, R- and S-enantiomers, diastereomers, (D)-isomers, (L)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in this invention.

Isomeric mixtures containing any of a variety of isomer ratios may be utilized in accordance with the present invention. For example, where only two isomers are combined, mixtures containing 50:50, 60:40, 70:30, 80:20, 90:10, 95:5, 96:4, 97:3, 98:2, 99:1, or 100:0 isomer ratios are all contemplated by the present invention. Those of ordinary skill in the art will readily appreciate that analogous ratios are contemplated for more complex isomer mixtures.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "alkane" is given its ordinary meaning in the art and refers to a saturated hydrocarbon molecule. The term "branched alkane" refers to an alkane that includes one or more branches, while the term "unbranched alkane" refers to an alkane that is straight-chained. The term "cyclic alkane" refers to an alkane that includes one or more ring structures, and may be optionally branched. The term "acyclic alkane" refers to an alkane that does not include any ring structures, and may be optionally branched.

The term "alkene" is given its ordinary meaning in the art and refers to an unsaturated hydrocarbon molecule that includes one or more carbon-carbon double bonds. The term "branched alkene" refers to an alkene that includes one or more branches, while the term "unbranched alkene" refers to an alkene that is straight-chained. The term "cyclic alkene" refers to an alkene that includes one or more ring structures, and may be optionally branched. The term "acyclic alkene" refers to an alkene that does not include any ring structures, and may be optionally branched.

The term "aromatic" is given its ordinary meaning in the art and refers to aromatic carbocyclic groups, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls.

These and other aspects of the present invention will be further appreciated upon consideration of the following Examples, which are intended to illustrate certain particular embodiments of the invention but are not intended to limit its scope, as defined by the claims.

EXAMPLES

Example 1

A series of laboratory tests were conducted to characterize the effectiveness of a series of microemulsions incorporating a variety of solvents. For these experiments, samples of a base microemulsion were prepared in which a detergent range alcohol ethoxylate surfactant was first blended in a 1:1 ratio with isopropyl alcohol. The surfactant employed in the tests was Neodol 25-7 (obtained from Shell Chemical Co.; e.g., a surfactant comprising linear $C_{12}$-$C_{15}$ alcohol ethoxylates with on average 7 moles of ethylene oxide). The microemulsions in Table 2 were prepared by mixing 46 parts by weight of this blend with 27 parts by weight a solvent as shown in Table 2 and 27 parts by weight of water, with the exception of nonane and decane, which were prepared by mixing 50 parts of the blend with 25 parts by weight of solvent and 25 parts per weight of water. Two emulsions were also prepared using the same method comprising a mixture of a hydrocarbon solvent and a terpene (1:1 ratio of hydrocarbon:terpene). The solvents were obtained through commercial sources. The heavy aromatic naphtha employed was Exxon Aromatic 150 Fluid which comprises $C_{10-12}$ alkyl benzenes and has a distillation temperature between 363-396° F. and the light aromatic naphtha employed was Exxon Aromatic 100 Fluid which comprises $C_{9-10}$ dialkyl and trialkylbenzenes and has a distillation temperature between 322-340° F.

The mixtures were identified as a microemulsion based on the spontaneous formation with minimal mechanical energy input to form a clear dispersion from an immiscible mixture of water and solvent upon addition of an appropriate amount of surfactant. The order of mixing of this and other compositions described in this example were not necessary, but for convenience, a procedure was generally followed in which a mixture of the surfactant and the isopropyl alcohol was first prepared then combined that with a mixture of the solvent and water. With small samples, in the laboratory, a few seconds of gentle mixing yielded a transparent dispersion.

Subsequently, 2 gallons per thousand (gpt) dilutions of the microemulsions were prepared and tested. The dilutions comprise 0.2 wt % of the microemulsion in 2 wt % KCl solution. The process employed dispensing 200 microliters of the microemulsion into a vortex of a vigorously stirred beaker containing 100 mL of 2 wt % KCl, generally at room temperature (e.g., about 25° C.).

TABLE 2

| CAS # | Solvent | Maximum Displacement by Gas (%) | Displacement by Oil at 60 min (%) | Boiling point (° F.) |
|---|---|---|---|---|
| 104-51-8 | butylbenzene | 30.0 | 89.4 | 361.9 |
| 64742-94-5 | heavy aromatic naphtha | 33.6 | 91.5 | 363-396 |
| 64742-95-6 | light aromatic naphtha | 36.4 | 53.7 | 322-340 |
| 143-08-8 | 1-nonanol | 41.2 | 92.9 | |
| 1678-92-8 | propyl-cyclohexane | 45.6 | 91.1 | |
| 112-30-1 | 1-decanol | 47.5 | 93.0 | |
| 112-58-3 | dihexylether | 50.1 | 92.5 | |
| 3710-30-3 | 1,7-octadiene | 50.3 | 92.3 | |
| 1077-16-3 | hexylbenzene | 55.3 | 90.5 | 439 |
| 111-84-2 | nonane | 55.9 | 90.1 | |
| 124-18-5 | decane | 56.5 | 82.5 | |
| 111-66-0 | 1-octene | 56.9 | 90.8 | |
| 540-84-1 | isooctane | 58.8 | 84.4 | |
| 111-65-9 | octane | 60.8 | 89.1 | |
| 540-84-1 | heptane | 63.0 | 89.5 | |
| 108-67-8 | mesitylene | 33.2 | 80.2 | 328.5 |
| 1330-20-7 | xylenes | 66.6 | 54.1 | 281.3 |
| 108-88-3 | toluene | 65.7 | | 232 |
| 104-76-7 | 2-ethyl-1-hexanol | 60.5 | 35.5 | |
| 111-87-5 | 1-octanol | 84.8 | 67.4 | |
| | 1:1 d-limonene and octane | 49.6 | 88.7 | |
| | 1:1 alpha-terpineol and octanol | 86.2 | 49.5 | |

Tables 3 and 4 provide data related to microemulsions comprising octane wherein the water to oil ratio and the surfactant were varied. The components of the formulation are given in Table 4 and the results are provided in Table 3. The greater efficacy of displacement of residual aqueous treatment fluid for the microemulsions comprising octane by crude oil compared with gaseous hydrocarbon was maintained over the range of water to oil ratio of 3.2:1 to 1:4 or surfactant/co-solvent concentrations from 40-50.

TABLE 3

Effectiveness of brine displacement by gas and oil using a microemulsion comprising octane.

| Experiment # (water-to-oil ratio) | Maximum displacement of brine (%) by gas | Displacement of brine (%) by crude oil at 120 minutes |
|---|---|---|
| 1 (3.2:1) | 60 | 91 |
| 2 (1.8:1) | 65 | 92 |
| 3 (9:1) | 57 | 93 |
| 4 (1:4) | 50 | 92 |
| 5 (9:1) | 55 | 92 |

TABLE 4

Formulation compositions

| Experiment # | DI water (wt %) | Octane (wt %) | 1:1 Blend of Neodol 25-7 and IPA (wt%) |
|---|---|---|---|
| 1 | 38 | 12 | 50 |
| 2 | 32 | 18 | 50 |
| 3 | 45 | 5 | 50 |
| 4 | 10 | 40 | 50 |
| 5 | 54 | 6 | 40 |

Example 2

This example described a non-limiting experiment for determining displacement of residual aqueous treatment fluid by formation crude oil. A 25 cm long, 2.5 cm diameter capped glass chromatography column was packed with 77 grams of 100 mesh sand. The column was left open on one end and a PTFE insert containing a recessed bottom, 3.2 mm diameter outlet, and nipple was placed into the other end. Prior to placing the insert into the column, a 3 cm diameter filter paper disc (Whatman, #40) was pressed firmly into the recessed bottom of the insert to prevent leakage of 100 mesh sand. A 2" piece of vinyl tubing was placed onto the nipple of the insert and a clamp was fixed in place on the tubing prior to packing. The columns were gravity-packed by pouring approximately 25 grams of the diluted microemulsions (e.g., the microemulsions described in Example 1, and diluted with 2% KCl, e.g., to about 2 gpt, or about 1 gpt) into the column followed by a slow, continuous addition of sand. After the last portion of sand had been added and was allowed to settle, the excess of brine was removed from the column so that the level of liquid exactly matched the level of sand. Pore volume in the packed column was calculated as the difference in mass of fluid prior to column packing and after the column had been packed. Three additional pore volumes of brine were passed through the column. After the last pore volume was passed, the level of brine was adjusted exactly to the level of sand bed. Light condensate oil was then added on the top of sand bed to form the 5 cm oil column above the bed. Additional oil was placed into a separatory funnel with a side arm open to the atmosphere. Once the setup was assembled, the clamp was released from the tubing, and timer was started. Throughout the experiment the level of oil was monitored and kept constant at a 5 cm mark above the bed. Oil was added from the separatory funnel as necessary, to ensure this constant level of head in the column. Portions of effluent coming from the column were collected into plastic beakers over measured time intervals. The amount of fluid was monitored. When both brine and oil were produced from the column, they were separated with a syringe and weighed separately. The experiment was conducted for 2 hours at which time the steady-state conditions were typically reached. The cumulative % or aqueous fluid displaced from the column over a 120 minute time period, and the steady-state mass flow rate of oil at t=120 min through the column were determined.

Example 3

This example described a non-limiting experiment for determining displacement of residual aqueous treatment fluid by formation gas. A 51 cm long, 2.5 cm inner-diameter capped glass chromatography column was filled with approximately 410±20 g of 20/40 mesh Ottawa sand and the diluted microemulsions (e.g., the microemulsions described in Example 1, and diluted with 2% KCl, e.g., to about 2 gpt, or about 1 gpt). To ensure uniform packing, small amounts of proppant were interchanged with small volumes of liquid. Periodically the mixture in the column was homogenized with the help of an electrical hand massager, in order to remove possible air pockets. Sand and brine were added to completely fill the column to the level of the upper cap. The exact amounts of fluid and sand placed in the column were determined in each experiment. The column was oriented vertically and was connected at the bottom to a nitrogen cylinder via a gas flow controller pre-set at a flow rate of 60 cm$^3$/min. The valve at the bottom was slowly opened and liquid exiting the column at the top was collected into a tarred jar placed on a balance. Mass of collected fluid was recorded as a function of time by a computer running a data logging software. The experiments were conducted until no more brine could be displaced from the column. The total % of fluid recovered was then calculated.

Example 4

This example describes a method for determining the phase inversion temperature of a solvent (e.g., a terpene). The methods are described in the literature (e.g., see Strey, Microemulsion microstructure and interfacial curvature. Colloid & Polymer Science, 1994. 272(8): p. 1005-1019; Kahlweit et al., Phase Behavior of Ternary Systems of the Type H$_2$O-Oil-Nonionic Amphiphile (Microemulsions). Angewandte Chemie International Edition in English, 1985. 24(8): p. 654-668.). As will be known in the art, the PIT measured for a given oil or solvent depends on the surfactant and aqueous phase in which it is measured. In this example, a 1:1 mixture of terpene solvent and de-ionized water was combined with varying amounts of a 1:1 blend of Neodol 25-7 and IPA and the upper and lower temperature boundaries of the one-phase microemulsion region were determined. A phase diagram such as this, plotting temperature against surfactant concentration at a constant oil-to-water ratio is often called a "fish" diagram or a Kahlweit plot. The phase inversion temperature was determined as the point on the "fish-tail" at which the temperature range of one-phase microemulsion closes to a vertex. In this example, the temperature at the vertex was selected as the PIT. An exemplary fish diagram indicating the PIT is shown in FIG. 1. For the terpene solvents used in this example, the PIT values which were measured using this above-described procedure are shown in Table 1. Those terpenes containing alcohol groups (linalool, geraniol, nopol, α-terpineol and menthol), gave PIT values between −4° C. and 16° C. Eucalyptol, containing an ether-oxygen, and menthone, containing a carbonyl oxygen, gave somewhat higher values near 30° C. d-limonene gave 109.4° F., while other non-oxygen containing terpenes gave values between 48-58° C.

Example 5

A series of laboratory tests similar to as described in Example 1 were conducted to characterize the effectiveness of a series of microemulsions incorporating a range of terpenes. The phase inversion temperatures of the terpenes were determined as described in Example 4.

Table 5 shows results for displacement of residual aqueous treatment fluid by oil and gas for formulations (e.g., using the experimental procedures outlined in Examples 2 and 3) using dilutions of the microemulsions comprising 46 parts of 1:1 Neodol 25-7, 27 parts deionized water, and 27 parts terpene solvent). The dilutions were prepared of each microemulsion in 2% KCl, at 2 gpt. The table shows that the terpene solvents with PIT values higher than 109.4° F. all give approximately 90% recovery, while those below 109.4° F. give significantly lower recovery. Table 5 also shows displacement by gas results for the dilutions that demonstrates that terpene solvents with PIT values higher than 109.4° F. give approximately 40% recovery, while those with PIT values below 109.4° F. give significantly higher recovery.

TABLE 5

PIT values for various terpene solvents (e.g., measured at 1:1 water-oil). Displacement results for 2 gpt dilution of microemulsions comprising 46:27:27 surfactant:water:terpene + isopropanol formulations.

| Terpene | Phase Inversion Temperature ° F. (° C.) | Displacement of brine (%) by crude oil at 60 minutes | Maximum displacement of brine (%) by gas |
|---|---|---|---|
| linalool | 24.8 (−4) | — | 81.9 |
| geraniol | 31.1 (−0.5) | 69.3 | 67.8 |
| nopol | 36.5 (2.5) | 80.3 | 58.8 |
| α-terpineol | 40.3 (4.6) | 80 | 92.9 |
| menthol | 60.8 (16) | 49.7 | — |
| eucalyptol | 87.8 (31) | — | 54.6 |
| menthone | 89.6 (32) | 79.4 | — |
| d-limonene | 109.4 (43) | 89.3 | 45.6 |
| terpinolene | 118.4 (48) | 90.5 | 41.8 |
| β-occimene | 120.2 (49) | 90.2 | 44.2 |
| γ-terpinene | 120.2 (49) | 89 | 32.2 |
| α-pinene | 134.6 (57) | 89.9 | 38.7 |
| citronellene | 136.4 (58) | 88.2 | 40.5 |

The results shown in Table 6 demonstrate that at a 1:1 ratio of terpene to water, and 46 weight % surfactant-IPA, the high PIT α-pinene performed better on oil displacement and much poorer on gas displacement than the low PIT α-terpineol. As the terpene-to-water ratio decreases from 27-27 to 21-33 to 11-43, the difference in oil displacement performance decreased, then increased again at the lower level. Higher surfactant levels did not substantially increase or decrease the displacement (which may suggest that the microemulsion is performing differently than a surfactant package lacking the terpene solvent). The displacement by gas was better for the low PIT α-terpineol than for the high PIT α-pinene.

TABLE 6

Oil and Gas displacement results for α-pinene and α-terpineol as a function of surfactant concentration and solvent-to-water ratio.

| Formulation T/S/W* | Terpene | Displacement of brine (%) by crude oil at 60 minutes | Maximum displacement of brine (%) by gas |
|---|---|---|---|
| 27-46-27 | α-terpineol | 80 | 92.9 |
| 27-46-27 | α-pinene | 89.9 | 38.7 |
| 21-46-33 | α-terpineol | 88 | 83 |
| 21-46-33 | α-pinene | 87 | 46 |
| 11-46-43 | α-terpineol | 88.5 | 80 |
| 11-46-43 | α-pinene | 96 | 47 |
| 15-56-28 | α-terpineol | 87.8 | 85 |
| 15-56-28 | α-pinene | 88.6 | 52 |

*T/S/W stands for terpene weight %/1:1 surfactant-IPA weight %/deionized water wt %

It will be evident to one skilled in the art that the present disclosure is not limited to the foregoing illustrative examples, and that it can be embodied in other specific forms without departing from the essential attributes thereof. It is therefore desired that the examples be considered in all respects as illustrative and not restrictive, reference being made to the appended claims, rather than to the foregoing examples, and all changes which come within the meaning and range of equivalency of the claims are therefore intended to be embraced therein.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element or a list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of treating an oil well having a wellbore, comprising:
    injecting a microemulsion into the wellbore to increase formation crude oil production by the well, wherein the microemulsion comprises water, a first type of solvent, and a first type of surfactant, wherein the microemulsion includes a continuous water phase,
    wherein the first type of solvent is selected from the group consisting of unsubstituted cyclic or acyclic, branched or unbranched alkanes having 6-12 carbon atoms, unsubstituted acyclic branched or unbranched alkenes having one or two double bonds and 6-12 carbon atoms, cyclic or acyclic, branched or unbranched alkanes having 9-12 carbon atoms and substituted with only an —OH group, branched or unbranched dialkylether compounds having the formula $C_nH_{2n+1}OC_mH_{2m+1}$, wherein n+m is between 6 and 16, and aromatic solvents having a boiling point between about 300-400° F.

2. The method of claim 1, wherein the ratio of water to solvent is between about 15:1 and 1:10.

3. The method of claim 1, wherein the microemulsion further comprises a second type of solvent.

4. The method of claim 1, wherein the microemulsion is diluted with an aqueous fluid prior to injection to the wellbore.

5. The method of claim 4, wherein the microemulsion is diluted to between about 0.1 wt % and about 2 wt %.

6. The method of claim 4, wherein the microemulsion is diluted with an aqueous fluid selected from the group consisting of water, brine and a well-treatment fluid.

7. The method of claim 6, wherein the well-treatment fluid is selected from the group consisting of an acid, a fracturing fluid and slickwater.

8. The method of claim 1, wherein the microemulsion further comprises a freezing point depression agent.

9. The method of claim 8, wherein the microemulsion comprises a first type of freezing point depression agent and a second type of freezing point depression agent.

10. The method of claim 8, wherein the freezing point depression agent is selected from the group consisting of an alkylene glycol, an alcohol, a combination of choline chloride and urea, and a salt.

11. The method of claim 8, wherein the freezing point depression agent is present in an amount between about 5 wt % and about 40 wt %.

12. The method of claim 1, wherein the surfactant is an alkyl polyglycol or alkyl polyglucoside nonionic surfactant.

13. The method of claim 1, wherein the microemulsion further comprises a second type of surfactant.

14. The method of claim 13, wherein the first type of surfactant is an alkyl polyglycol or alkyl polyglucoside nonionic surfactant and the second type of surfactant is an anionic, cationic, or zwitterionic surfactant.

15. The method of claim 1, wherein the first type of surfactant is present in an amount between about 15 wt % and 55 wt %.

\* \* \* \* \*